(12) United States Patent
Hojo et al.

(10) Patent No.: US 7,060,757 B2
(45) Date of Patent: Jun. 13, 2006

(54) RUBBER COMPOSITION AND PNEUMATIC TIRE USING THE SAME

(75) Inventors: Masahiro Hojo, Kodaira (JP); Kumi Fujiki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 13 days.

(21) Appl. No.: 10/771,396

(22) Filed: Feb. 5, 2004

(65) Prior Publication Data

US 2004/0220351 A1 Nov. 4, 2004

(30) Foreign Application Priority Data

Feb. 6, 2003 (JP) .............................. 2003-029397
Feb. 6, 2003 (JP) .............................. 2003-029404
Dec. 24, 2003 (JP) .............................. 2003-426560

(51) Int. Cl.
*C08F 136/08* (2006.01)
*C08F 12/08* (2006.01)
*C08K 5/42* (2006.01)
*C08K 5/36* (2006.01)

(52) U.S. Cl. .............................. 525/333.1; 525/332.6; 525/333.5; 524/161; 524/157; 524/173; 524/201; 524/202; 524/203

(58) Field of Classification Search ............. 525/333.2, 525/333.1, 332.6, 333.5, 340, 342, 344, 351, 525/352, 353; 524/157, 161
See application file for complete search history.

(56) References Cited

U.S. PATENT DOCUMENTS

| 3,979,369 A | | 9/1976 | Trivette, Jr. ................ 260/79.5 |
| 4,417,012 A | * | 11/1983 | Moniotte ..................... 524/83 |
| 4,520,154 A | * | 5/1985 | Moniotte ..................... 524/157 |
| 4,587,296 A | * | 5/1986 | Moniotte ..................... 525/61 |
| 5,698,640 A | * | 12/1997 | Duvdevani et al. ...... 525/333.4 |
| 5,717,038 A | | 2/1998 | Horpel et al. ............. 525/332.4 |
| 6,207,764 B1 | * | 3/2001 | Ignatz-Hoover ......... 525/332.6 |
| 6,374,889 B1 | * | 4/2002 | McElrath et al. ........... 152/525 |
| 6,386,255 B1 | * | 5/2002 | Majumdar et al. .......... 152/367 |
| 6,581,660 B1 | * | 6/2003 | Meza et al. .............. 152/209.5 |
| 6,624,220 B1 | * | 9/2003 | Waddell et al. ............ 524/265 |
| 6,693,145 B1 | * | 2/2004 | Graf et al. .................. 524/495 |
| 2002/0062894 A1 | * | 5/2002 | Miner et al. ................ 152/517 |

FOREIGN PATENT DOCUMENTS

| EP | 1 172 430 A2 | * | 1/2002 |
| JP | 10-195237 A | * | 7/1998 |
| JP | 2002-69236 A | | 3/2002 |
| JP | 2002-069236 A | * | 3/2002 |
| JP | 2002-362107 A | * | 12/2002 |

OTHER PUBLICATIONS

JP 2002-069236 (English translation).*
JP 10-195237 (English translation).*
JP 2002-362107 (abstract and translation in English).*
KR 2002-49429 (abstract).*
R.N. Datta, "A Review on Heat and Reversion Resistance Compounding", *Progress in Rubber, Plastics and Recycling Technology*, vol. 19, No. 3, 2003, pp. 143-170 (XP009029577).
M. Abele et al., "Handbuch für die Gummi-Industrie", May 1, 1971, pp. 319, 326-327; table 3.4.1.6 (XP-002277985).

* cited by examiner

*Primary Examiner*—David W. Wu
*Assistant Examiner*—Rip A. Lee
(74) *Attorney, Agent, or Firm*—Sughrue Mion, PLLC

(57) ABSTRACT

A rubber composition comprises (1) a rubber component including at least one of polybutadiene rubber and a styrene-butadiene copolymer rubber having a content of vinyl bond of not less than 30%, (2) at least one specified compound as a vulcanization accelerator, and (3) a specified organic thiosulfate compound as a vulcanizing agent.

11 Claims, No Drawings

RUBBER COMPOSITION AND PNEUMATIC TIRE USING THE SAME

BACKGROUND OF THE INVENTION

1. Field of the Invention

This invention relates to a rubber composition and a pneumatic tire using the same, and more particularly to a rubber composition capable of using in a tire tread to improve a resistance to thermal fatigue without deteriorating a high steering stability on a dry road surface (dry gripping property).

2. Description of Related Art

The tire tread is required to have a high steering stability on a dry road surface (dry gripping property). In order to improve the dry gripping property, an amount of an oil component such as a resin, an aromatic oil, a liquid polymer or the like has hitherto been increased in a rubber composition for the tread. However, as the amount of the oil component is increased, a resistance to dynamically thermal fatigue is lowered and hence there is a problem that cracks are apt to be easily caused by heat generation and deformation of an interior of the tire during the running of the tire.

In regard to this problem, it is considered to use a thiuram compound, a metal salt of dithiocarbamic acid, a metal salt of dithiophosphoric acid or the like as a vulcanization accelerator capable of increasing monosulfide for mainly improving a thermally stability in crosslinking (JP-A-5-262916 and JP-A-2001-316527). However, as the compounding amount of such a compound is too large, the statically heat resistance is improved, but there is a problem that the fatigue resistance lowers and hence the resistance to thermal fatigue is not improved.

Also, it is considered to use a heat-resistant crosslinking agent such as phenylene bismaleimide, PK900 (N,N'-m-xylene-bis-citraconimide), sodium 1,6-hexamethylene dithiosulfate bihydrate or the like (JP-A-2000-301908). Such a compound is excellent in the reactivity to natural rubber and isoprene rubber, but is low in the reactivity to polybutadiene rubber and styrene-butadiene copolymer rubber having a high content of vinyl bond. Therefore, even if a greater amount of this compound alone is compounded with a rubber component having a high content of vinyl bond, there is a problem that the resistance to thermal fatigue is not improved.

As mentioned above, there is not yet provided a technique capable of largely improving the resistance to thermal fatigue in the tire while maintaining the high dry gripping property.

SUMMARY OF THE INVENTION

It is, therefore, an object of the invention to solve the aforementioned problems of the conventional technique and to provide a rubber composition capable of using in a tire tread to improve the resistance to thermal fatigue while maintaining the high gripping property of the tire as well as a high performance tire using such a rubber composition in a tread.

The inventors have made various studies in order to achieve the above object and found that rubber compositions capable of improving the resistance to thermal fatigue while maintaining the high gripping property of the tire can be obtained by compounding a specified vulcanization accelerator and a specified vulcanizing agent with a specified rubber component, and as a result, the invention has been accomplished.

According to the invention, there is the provision of a rubber composition comprising (1) a rubber component including at least one of polybutadiene rubber and a styrene-butadiene copolymer rubber having a content of vinyl bond of not less than 30%, preferably not less than 40%, (2) at least one compound selected from a compound represented by the following formula (I), a compound represented by the following formula (II), a compound represented by the following formula (III) and a compound represented by the following formula (IV), and (3) an organic thiosulfate compound represented by the following formula (V):

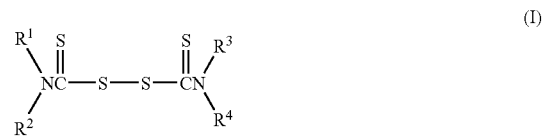

(I)

wherein $R^1$, $R^2$, $R^3$ and $R^4$ are independently a straight or branched alkyl group having a carbon number of 3–12 or an aralkyl group having a carbon number of 7–12;

(II)

wherein $R^5$ and $R^6$ are independently a straight or branched alkyl group having a carbon number of 7–12 or an aralkyl group having a carbon number of 7–12, and $M^1$ is a bivalent or polyvalent metal and n is a number equal to an atomic valence of $M^1$;

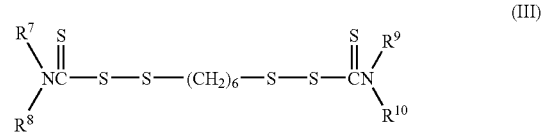

(III)

wherein $R^7$, $R^8$, $R^9$ and $R^{10}$ are independently a straight or branched alkyl group having a carbon number of 3–12 or an aralkyl group having a carbon number of 7–12;

(IV)

wherein $R^{11}$ and $R^{12}$ are independently a straight or branched alkyl group having a carbon number of 1–18 or a cycloalkyl group having a carbon number of 5–12, and $M^2$ is zinc, copper or iron and m is a number equal to an atomic valence of $M^2$;

$$M^3O_3S\text{—}S\text{—}(CH_2)_o\text{—}S\text{—}SO_3M^3 \qquad (V)$$

wherein o is a number of 3–10 and M³ is one equivalent of lithium, potassium, sodium, magnesium, calcium, barium, zinc, nickel or cobalt, provided that the compound may contain crystal water.

In the rubber composition of the invention, it is preferable that $R^1$, $R^2$, $R^3$ and $R^4$ in the formula (I) are independently a straight or branched alkyl group having a carbon number of 8–12. Preferably, each of $R^1$, $R^2$, $R^3$ and $R^4$ is 2-ethylhexyl group.

In the rubber composition of the invention, it is preferable that $R^{11}$ and $R^{12}$ in the formula (IV) are independently a straight or branched alkyl group having a carbon number of 2–8. Preferably, each of $R^{11}$ and $R^{12}$ is isopropyl group or n-butyl group.

In the rubber composition of the invention, it is preferable that the styrene-butadiene copolymer rubber has a bound styrene content of 20–60 mass %. Preferably, the bound styrene content is 30–45 mass %.

In the rubber composition of the invention, it is preferable that a content of the styrene-butadiene copolymer rubber (SBR) in the rubber component is 50–100 mass %. Preferably, the content of the SBR in the rubber component is 70–100 mass %.

In the rubber composition of the invention, the organic thiosulfate compound represented by the formula (V) is preferable to be sodium 1,6-hexamethylene dithiosulfate dihydrate.

In the rubber composition of the invention, it is preferable that a total amount of the compound of the formula (I), the compound of the formula (II) and the compound of the formula (III) is 0.5–10 parts by mass based on 100 parts by mass of the rubber component. Particularly, an amount of the compound of the formula (I) is 0.5–10 parts by mass, preferably 1–7 parts by mass based on 100 parts by mass of the rubber component.

In the rubber composition of the invention, it is preferable that an amount of the compound of the formula (IV) is 0.1–5 parts by mass based on 100 parts by mass of the rubber component. Preferably, the amount of the compound of the formula (IV) is 2–6 parts by mass.

In the rubber composition of the invention, it is preferable that an amount of the compound of the formula (V) is 1–10 parts by mass based on 100 parts by mass of the rubber component. Preferably, the amount of the compound of the formula (V) is 2–6 parts by mass.

According to the invention, there is the provision of a pneumatic tire characterized by using the aforementioned rubber composition in a tread. In the tire according to the invention, a gas to be filled in the tire includes normal air, air having a changed partial oxygen pressure, and an inert gas such as nitrogen gas or the like.

DETAILED DESCRIPTION OF THE INVENTION

The invention will be described in detail below. The rubber composition according to the invention is constituted by compounding (1) a rubber component including at least one of polybutadiene rubber and styrene-butadiene copolymer rubber having a content of vinyl bond of not less than 30% with (2) at least one compound selected from a compound represented by the formula (I), a compound represented by the formula (II), a compound represented by the formula (III) and a compound represented by the formula (IV) and (3) an organic thiosulfate compound represented by the formula (V).

The organic thiosulfate compound of the formula (V) is high in the reactivity to natural rubber or cis-1,4-polybutadiene rubber, but is low in the reactivity to polybutadiene rubber or styrene-butadiene copolymer rubber having a high content of vinyl bond, so that it does not sufficiently act as a vulcanizing agent to the rubber component having a high content of vinyl bond and hence it can not improve the resistance to thermal fatigue in the rubber composition. In the rubber composition according to the invention, however, the compound represented by any of the formulae (I) to (IV) is compounded as a vulcanization accelerator and promotes the reaction between the rubber component having a high content of vinyl bond and the organic thiosulfate compound, so that the resistance to thermal fatigue is considerably improved.

The rubber component used in the rubber composition of the invention includes at least one of polybutadiene rubber (BR) and styrene-butadiene copolymer rubber (SBR) having a content of vinyl bond of not less than 30%, preferably not less than 40%. In this case, the styrene-butadiene copolymer rubber is preferable to have a content of bound styrene unit, i.e. a bound styrene content of 20–60 mass %. When the bound styrene content of the styrene-butadiene copolymer rubber is less than 20 mass %, a desired gripping force at low temperature zone and high temperature zone can not be obtained, while when it exceeds 60 mass %, a block rigidity becomes excessively high and an amount of the tread rubber biting into a road surface decreases and hence the desired gripping force can not be obtained. Particularly, the styrene-butadiene copolymer rubber is preferable to have a bound styrene content of 30–45 mass % because the effects become conspicuous in this range. Moreover, the content of vinyl bond can be determined by analyzing a microstructure through an infrared spectrometry (Morero process), and the bound styrene content can be determined by calculating an integral ratio of $^1$H-NMR spectrum. The styrene-butadiene copolymer rubber may be synthesized by any polymerization method such as emulsion polymerization, solution polymerization and the like. Further, oil-extended ones can be preferably used as BR and SBR having a high content of vinyl bond. As Br and SBR having a high content of vinyl bond are extended with an oil, the milling can be carried out easily and surely without causing slippage in case of using a Banbury mixer or the like. The content of SBR in the rubber component is preferably 50–100% by mass, more preferably 70–100% by mass.

As the rubber component, natural rubber (NR), isoprene rubber (IR), acrylonitrile-butadiene rubber (NBR), chloroprene rubber, ethylene-propylene rubber (EPM), ethylene-propylene-diene terpolymer, butyl rubber, acrylic rubber or the like may be blended with the above BR and SBR having a high content of vinyl bond.

In the rubber composition according to the invention, the compound (thiuram compound) of the formula (I), the compound (dithiocarbamate compound) of the formula (II), the compound of the formula (III) and the compound (metal salt of dithiophosphoric acid) of the formula (IV) serve as a vulcanization accelerator.

In the formula (I), $R^1$, $R^2$, $R^3$ and $R^4$ are independently a straight of branched alkyl group having a carbon number of 3–12 or an aralkyl group having a carbon number of 7–12. As the straight or branched alkyl group are mentioned 2-ethylhexyl group, isoproyl group, isobutyl group, dodecyl group and so on. As the aralkyl group are mentioned benzyl group and so on. When the carbon number of the alkyl group is less than 3, the dispersion into the rubber component becomes poor and the heat resistance is deteriorated, while when the carbon number exceeds 12, the curing rate is considerably delayed. As the compound of the formula (I) are concretely mentioned tetrakis-2-ethylhexyl thiuram disulfide, tetrakis-isopropyl thiuram disulfide, tetrakis-isobutyl thiuram disulfide, tetrakis-dodecyl thiuram disulfide, tetrakis-benzyl thiuram disulfide and so on.

In the formula (II), $R^5$ and $R^6$ are independently a straight of branched alkyl group having a carbon number of 7–12 or an aralkyl group having a carbon number of 7–12. As the straight or branched alkyl group are mentioned 2-ethylhexyl group, dodecyl group and so on. As the aralkyl group are mentioned benzyl group and so on. When the carbon number is less than 7, the dispersion into the rubber component becomes poor and the heat resistance is deteriorated, while when the carbon number exceeds 12, the curing rate is considerably delayed. Also, $M^1$ is a bivalent or polyvalent metal, and n is a number equal to an atomic value of $M^1$. As the metal are mentioned zinc, antimony, iron, copper, nickel, lead, tellurium and so on. Among them, zinc is preferable. As the compound of the formula (II) are concretely mentioned zinc 2-ethylhexyl dithiocarbamate, zinc dodecyl dithiocarbamate, zinc benzyl dithiocarbamate and so on.

In the formula (III), $R^7$, $R^8$, $R^9$ and $R^{10}$ are independently a straight of branched alkyl group having a carbon number of 3–12 or an aralkyl group having a carbon number of 7–12. As the straight or branched alkyl group are mentioned 2-ethylhexyl group, isopropyl group, isobutyl group, dodecyl group and so on. As the aralkyl group are mentioned benzyl group and so on. When the carbon number of the alkyl group is less than 3, the dispersion into the rubber component becomes poor and the heat resistance is deteriorated, while when the carbon number exceeds 12, the curing rate is considerably delayed. As the compound of the formula (III) are concretely mentioned 1,6-bis(N,N'-dibenzyl thiocarbamoyldithio)-hexane, 1,6-bis(N,N'-di(2-ethylhexyl) thiocarbamoyldithio)-hexane and so on.

The compound of the formula (III) includes a part of the structure of the formula (I) and a part of the structure of the formula (V), so that it serves as not only the vulcanization accelerator but also the vulcanizing agent. For this end, when the rubber composition contains the above BR and/or SBR having a high content of vinyl bond and the compound of the formula (III), even if the compound of the formula (V) is not compounded, the resulting rubber composition can develop a high dry gripping property and a high resistance to thermal fatigue.

Among the compounds of the formulae (I) to (III), the thiuram compounds having an alkyl group are preferable in view of the heat resistance, fracture resistance and cost, and tetrakis-2-ethylhexyl thiuram disulfide is most preferable.

In the formula (IV), $R^{11}$ and $R^{12}$ are independently a straight or branched alkyl group having a carbon number of 1–18 or a cycloalkyl group having a carbon number of 5–12. As $R^{11}$ and $R^{12}$, a straight or branched alkyl group having a carbon number of 2–8 is preferable, and a straight or branched alkyl group having a carbon number of 3–4 is further preferable, and isopropyl group and n-butyl group are most preferable. Also, $M^2$ in the formula (IV) is zinc, copper or iron, and particularly zinc is preferable. Moreover, m is a number equal to an atomic value of $M^2$. The compounds shown by the formula (IV) may be used alone or in a combination of two or more. As the compound of the formula (IV), zinc dithiophosphates are preferable in a point of providing a high resistance to thermal fatigue, and zinc dithiophosphates having a straight or branched alkyl group with a carbon number of 2–8 as $R^{11}$ and $R^{12}$ are most preferable.

As the straight or branched alkyl group of $R^{11}$ and $R^{12}$ are mentioned methyl group, ethyl group, propyl group, isopropyl group, butyl group, 4-methylpentyl group, 2-ethylhexyl group, octyl group, octadecyl group and so on. As the cycloalkyl group are mentioned cyclopentyl group, cyclohexyl group, cyclooctyl group and so on.

As the zinc dithiophosphate are concretely mentioned zinc O,O'-dibutyl dithiophosphate, zinc O,O'-diisopropyl dithiophosphate, zinc O,O'-dipropyl dithiophosphate, zinc O,O'-diethyl dithiophosphate, zinc O,O'-dimethyl dithiophosphate, zinc O,O'-bis(2-ethylhexyl) dithiophosphate, zinc O,O'-bis(4-methylpentyl) dithiophosphate, zinc O,O'-dioctadecyl dithiophosphate, zinc O,O'-dioctyl dithiophosphate, zinc O,O'-dicyclohexyl dithiophosphate and so on. Among them, zinc O,O'-dibutyl dithiophosphate, zinc O,O'-diisopropyl dithiophosphate and zinc O,O'-dioctyl dithiophosphate are preferable.

As copper dithiophosphate are mentioned copper O,O'-dioctadecyl dithiophosphate, copper O,O'-dibutyl dithiophosphate, copper O,O'-diisopropyl dithiophosphate, copper O,O'-dipropyl dithiophosphate, copper O,O'-diethyl dithiophosphate, copper O,O'-dimethyl dithiophosphate, copper O,O'-bis(2-ethylhexyl)dithiophosphate, copper O,O'-bis(4-methylpentyl) dithiophosphate, copper O,O'-dicyclohexyl dithiophosphate and so on.

As iron dithiophosphate are mentioned iron O,O'-dibutyl dithiophosphate, iron O,O'-diisopropyl dithiophosphate, iron O,O'-dipropyl dithiophosphate, iron O,O'-diethyl dithiophosphate, iron O,O'-dimethyl dithiophosphate, iron O,O'-bis(2-ethylhexyl)dithiophosphate, iron O,O'-bis(4-methylpentyl)dithiophosphate, iron O,O'-dioctadecyl dithiophosphate, iron O,O'-dicyclohexyl dithiophosphate and so on.

A total compounding amount of the compound of the formula (I), the compound of the formula (II) and the compound of the formula (III) is 0.5–10 parts by mass based on 100 parts by mass of the rubber component. When the total compounding amount of these compounds is less than 0.5 part by mass, the effect of sufficiently activating the compound of the formula (V) is not obtained, while when it exceeds 10 parts by mass, the fracture properties of the rubber composition lower. In this case, a compounding amount of the compound of the formula (I) is preferably 0.5–7 parts by mass, more preferably 1–7 parts by mass.

A compounding amount of the compound of the formula (IV) is 0.1–5 parts by mass, preferably 0.2–2 parts by mass based on 100 parts by mass of the rubber component. When the compounding amount of the compound of the formula (IV) is less than 0.1 part by mass, the effect of sufficiently activating the compound of the formula (V) is not obtained, while when it exceeds 5 parts by mass, the effect by the addition of such a compound is saturated and also the scorching time of the rubber composition is shortened to lower the operability.

The production method of the compound of the formula (IV) is not particularly limited. This compound is usually obtained by gradually adding sodium hydroxide to an aqueous solution of dithiophosphoric acid to form sodium dithiophosphate, adding a solution of zinc, copper or iron chloride in acetone dropwise thereto and then purifying and drying the resulting precipitate.

In the rubber composition according to the invention, the compound of the formula (IV) may be used alone as a vulcanization accelerator, but is preferable to be used together with a benzothiazole derivative in view of the prolonging of a Mooney scorch time. In this case, the benzothiazole derivative is preferable to include 2-benzothiazyl sulfenamides and 2-benzothiazyl sulfenimides. As the benzothiazole derivative, mention may be made of 2-mercaptobenzothiazole, dibenzothiazyl disulfide, N-cyclohexyl-2-benzothiazyl sulfenamide, N,N-dicyclohexyl-2-benzothiazyl sulfenamide, N,N-diisopropyl-2-benzothiazyl sulfenamide, N-t-butyl-2-benzothiazyl sulfenamide, N-t-butyl-2-benzothiazyl sulfenimide, N-cyclohexyl-2-benzothiazyl sulfenimide, 4,4'-dimethyldibenzothiazyl disulfide, N-oxydiethyfene-benzothiazyl sulfenimide and so on. Among them, N-t-butyl-2-benzothiazyl sulfenamide, N-cyclohexyl-2-benzothiazyl sulfenamide, N-t-butyl-2-benzothiazyl sulfenimide, N-cyclohexyl-2-benzothiazyl sulfenimide and the like are preferable in view of their effects.

The rubber composition according to the invention contains the organic thiosulfate compound of the formula (V) together with sulfur as a vulcanizing agent. A total compounding amount of the mixture as the vulcanizing agent is within a range of 1.0–10.0 parts by mass, preferably 2.0–6.0 parts by mass based on 100 parts by mass of the rubber component. When the total compounding amount of the vulcanizing agent is less than 1.0 part by mass, the sufficient modulus of elasticity can not be ensured, while when it exceeds 10.0 parts by mass, the elongation at break lowers and the resistance to rib chipping considerably lowers. Also, the compounding amount of the compound of the formula (V) is preferable to be 1.0–10.0 parts by mass, more preferably 2.0–6.0 parts by mass based on 100 parts by mass of the rubber component. When the compounding amount of the compound of the formula (V) is less than 1.0 part by mass, the resistance to thermal fatigue can not be sufficiently improved, while when it exceeds 10.0 parts by mass, the elongation at break lowers and the resistance to rib chipping considerably lowers.

In the formula (V), the number of methylene chains represented by o is required to be 3–10. When the number is less than 3, the effect of improving the resistance to thermal fatigue can not be sufficiently obtained, while when it exceeds 10, the effect of improving the resistance to thermal fatigue is small though the molecular weight increases. Moreover, the number of methylene chains is preferable to be 3–6 from a viewpoint of the control of intermolecular cyclizing reaction. Also, $M^3$ is one equivalent of lithium, potassium, sodium, magnesium, calcium, barium, zinc, nickel or cobalt, but potassium, sodium and so on are preferable considering the easiness of availability and effect. The compound of the formula (V) may be a hydrate containing crystalline water in its molecule. As the compound of the formula (V) are concretely mentioned a sodium salt monohydrate, a sodium salt dihydrate and so on, but a derivative of sodium thiosulfate, e.g. sodium 1,6-hexamethylene ditiosulfate dihydrate is preferable from a viewpoint of economical reasons. The organic thiosulfate compounds of the formula (V) may be used alone or in a combination of two or more.

Furthermore, the rubber composition according to the invention is preferable to contain carbon black having a nitrogen adsorption specific surface area ($N_2SA$) of 80–280 $m^2/g$ as a filler. When the nitrogen adsorption specific surface area of carbon black is less than 80 $m^2/g$, the sufficient modulus of elasticity is not obtained and the wear resistance is deteriorated, while when it exceeds 280 $m^2/g$, the improvement of the gripping force and the wear resistance is not expected and also the milling operability is deteriorated. As the carbon black, use may be made of commercially available carbon black HAF, ISAF, SAF and so on. Among them, carbon black SAF is preferable from a viewpoint that the gripping force on a wet road surface at a low temperature zone is established with the gripping force on a wet road surface or a semi-wet road surface at a high temperature zone. The carbon blacks may be used alone or in a combination of two or more.

The compounding amount of carbon black is preferably 70–200 parts by mass, more preferably 95–130 parts by mass based on 100 parts by mass of the rubber component. When the compounding amount of carbon number is less than 70 parts by mass, the dry gripping property and modulus of elasticity (E') of the rubber composition are insufficient, and the general properties such as strength and the like are not sufficient, and also the ground contact property is deteriorated to cause the deterioration of lap time. While, when it exceeds 200 parts by mass, the rubber composition is too hard and the wear resistance lowers and further the workability of the rubber composition is deteriorated.

Moreover, it is preferable that $C_9$ aromatic petroleum resin and/or alkylphenolic resin is compounded with the rubber composition. The term "$C_9$ aromatic petroleum resin" used herein means a polymer of $C_9$ aromatic monomer. As the $C_9$ aromatic monomer are mentioned vinyltoluene, α-methylstyrene, cumarone, indene and so on. The $C_9$ aromatic monomers may be used alone or in a combination of two or more. As the alkylphenolic resin are mentioned alkylphenol-acetylene resins such as p-t-butylphenol-acetylene and the like, cresols, xylenols and alkylphenol-formaldehyde resins including p-t-butylphenol, p-t-octylphenol and the like. These resins are preferable to have a softening point of 60–150° C. When the softening point of the resin is lower than 60° C., the sufficient gripping force is not obtained on a wet road surface and a semi-wet road surface at a high temperature zone, while when it exceeds 150° C., the resin is not uniformly dispersed in the milling and the wear resistance considerably lowers. These $C_9$ aromatic petroleum resins and alkylphenolic resins may be used alone or in a combination of two or more. The compounding amount of the resin(s) is 3–50 parts by mass, preferably 5–40 parts by mass based on 100 parts by mass of the rubber component. When the compounding amount of the resin(s) is less than 3 parts by mass, the effect of improving the wet performances such as gripping force and the like by the addition is not sufficiently obtained, while when it exceeds 50 parts by mass, the operability in the milling of the rubber composition is considerably deteriorated.

In the rubber composition according to the invention, it is necessary that an extract with acetone-chloroform after the vulcanization is 30–270 parts by mass based on 100 parts by mass of the rubber component. When the extract is less than 30 parts by mass or exceeds 270 parts by mass, the improvement of the gripping force and wear resistance is not expected and the milling operability is deteriorated. The extract is preferable to be 30–200 parts by mass from a viewpoint of simultaneous establishment of the gripping force, wear resistance and milling operability.

In addition to the above rubber component, vulcanization accelerator, vulcanizing agent, carbon black, $C_9$ aromatic petroleum resin and alkylphenolic resin, the rubber composition according to the invention may be properly compounded with various additives usually used in the rubber industry such as oiling agent, inorganic filler, softening agent, vulcanization accelerator other than the above defined ones, accelerator activator, antioxidant, zinc oxide, stearic acid, antiozonant, coloring agent, antistatic agent, lubricant, coupling agent, foaming agent, foaming assistant and so on within a scope not damaging the object of the invention. As these additives, use may be preferably made of commercially available ones.

The above oiling agent is not particularly limited and can be properly selected in accordance with the use purpose. As the oiling agent are preferable process oil, aromatic oil, naphthenic oil, paraffinic oil, ester oil, solution-like conjugated diene rubber, solution-like hydrogenated conjugated diene rubber and so on. As the oiling agent is included in the rubber composition, the fluidity of the rubber composition can be controlled. That is, the viscosity of the rubber composition can be lowered to enhance the fluidity and hence the extrusion can be well conducted.

The amount of the oiling agent to be compounded with the rubber composition inclusive of an amount of oil-extended portion when the above polybutadiene rubber and/or styrene-butadiene copolymer rubber is extended with an oil is preferably 35–200 parts by mass, more preferably 40–150 parts by mass based on 100 parts by mass of the rubber component. When the amount of the oiling agent is less than 35 parts by mass, the Mooney viscosity of the uncured rubber composition is extremely high to deteriorate the workability and the dry gripping property, while when it exceeds 200 parts by mass, the Mooney viscosity of the uncured rubber composition is extremely low to deteriorate the workability or the rubber after the vulcanization is too soft to deteriorate the wear resistance.

The rubber composition according to the invention is produced by milling the aforementioned rubber component, vulcanization accelerator and vulcanizing agent and, if necessary, various additives properly selected, and warming up, extruding and vulcanizing them.

The milling conditions are not particularly limited. The conditions such as charging volume into a milling apparatus, rotating velocity of a rotor, ram pressure, milling temperature, milling time, type of the milling apparatus and so on can be properly selected in accordance with the purpose. As the milling apparatus are mentioned a Banbury mixer usually used in the milling of the rubber composition, an intermix, kneader, and so on.

The warming-up conditions are not particularly limited. The conditions such as warming temperature, warming time, warming apparatus and so on can be properly selected in accordance with the purpose. As the warming apparatus are mentioned a roll machine usually used in the warming of the rubber composition, and so on.

The extruding conditions are not particularly limited. The conditions such as extruding time, extrusion rate, extrusion apparatus, extruding temperature and so on can be properly selected in accordance with the purpose. As the extrusion apparatus are mentioned an extruder usually used in the extrusion of the rubber composition for tires, and so on. The extruding temperature can be determined properly.

The apparatus, system and conditions for the vulcanization are not particularly limited and can be properly selected in accordance with the purpose. As the vulcanization apparatus are mentioned a mold vulcanizer usually used in the vulcanization of the rubber composition for tires, and so on. Among the vulcanizing conditions, the temperature is usually about 100–190° C.

The rubber composition according to the invention is suitable for a tread of a high-performance tire because the heat resistance, resistance to thermal fatigue and the like are improved while maintaining the high gripping property as previously mentioned.

The pneumatic tire according to the invention is characterized by using the aforementioned rubber composition in a tire tread. The construction of the tire according to the invention is not particularly limited except that the above rubber composition is applied to the tread, and the construction of the known tire can be adopted as it is.

As an example of the pneumatic tire according to the invention, there is mentioned a tire comprising a pair of bead portions, a pair of side portions, a tread portion, a carcass toroidally extending between the bead portions and a belt superimposed on a crown portion of the carcass. This tire may take a radial structure or a bias structure.

The tread is not particularly limited in the structure and may be a single layer structure or a multi-layer structure. The tread may have a so-called cap-base structure consisting of a cap portion directly contacting with a road surface and a base portion arranged adjacent to the cap portion and inward in a radial direction of the tire. In the invention, it is preferable that at least the cap portion is made of the rubber composition according to the invention.

The production method of the pneumatic tire according to the invention is not particularly limited. For example, such a tire can be produced by preparing the rubber composition according to the invention, laminating the rubber composition onto an uncured base portion previously piled on a crown portion of a green tire casing and vulcanization-building in a given mold under conditions of given temperature and pressure.

The following examples are given in illustration of the invention and are not intended as limitations thereof.

(1) Measurement of Time for Resistance to Thermal Fatigue (Laboratory Test)

Various rubber compositions are prepared according to a compounding recipe shown in Tables 1 and 2 by using a Banbury mixer. Each of the resulting rubber compositions is vulcanized at 145° C. for 45 minutes to form a vulcanizate sample and thereafter a fixed stress test is carried out by a flexometer according to JIS K6265 to measure a time until cracks are generated in an interior of the sample as a time for resistance to thermal fatigue, which is represented by an index on the basis that Comparative Example 1 is 100. The results are shown in Tables 1 and 2. Moreover, the larger the index value, the longer the time for resistance to thermal fatigue and the better the resistance to thermal fatigue.

(2) Evaluation of Resistance to Thermal Fatigue (Actual Running Test)

Each of the above rubber compositions is used in a tire tread to prepare a tire for a passenger car having a tire size of 225/40R18. The thus obtained tire is mounted onto a test vehicle and run on a test circuit course over a given distance. After the running, the interior and appearance of the tire are observed to evaluate the resistance to thermal fatigue according to the following standards. Moreover, the actual running test is not carried out in Comparative Example 4 and Examples 2, 4, 7 and 10. The results are shown in Tables 1 and 2.

0 . . . state of generating no chunk

−1 . . . state of generating crack of less than 0.5 mm in interior

−2 . . . state of generating crack of not less than 0.5 mm in interior

−3 . . . state of generating crack on outer surface

TABLE 1(a)

|  |  | Comparative Example 1 | Comparative Example 2 | Comparative Example 3 | Comparative Example 4 | Comparative Example 5 | Comparative Example 6 | Example 1 | Example 2 | Example 3 | Example 4 |
|---|---|---|---|---|---|---|---|---|---|---|---|
| Styrene-butadiene copolymer rubber A *1 | part by mass | 135 | 135 | 135 | 135 | — | — | — | — | — | — |
| Styrene-butadiene copolymer rubber B *2 |  | — | — | — | — | 150 | 150 | 150 | 150 | 150 | 150 |
| Carbon black *3 |  | 70 | 70 | 70 | 70 | 70 | 70 | 70 | 70 | 70 | 70 |
| Aromatic oil |  | 15 | 15 | 15 | 15 | 15 | 15 | — | — | — | — |
| Resin A *4 |  | 20 | 20 | 20 | 20 | 20 | 20 | 20 | 20 | 20 | 20 |
| Vulcanization accelerator (CZ) *5 |  | 2 | 2 | 1 | 1 | 1 | 2 | 1 | — | 2 | 2 |
| Vulcanization accelerator (TOT) *6 |  | — | — | 1 | 1 | 1 | — | 1 | 2 | 2 | 2 |
| Vulcanization accelerator (TBzTD) *7 |  | — | — | — | — | — | — | — | — | — | — |
| Vulcanization accelerator (ZTC) *8 |  | — | — | — | — | — | — | — | — | — | — |
| Vulcanization accelerator (KA9188) *9 |  | — | — | — | — | — | — | — | — | — | — |
| Vulcanization accelerator *10 |  | — | — | — | — | — | — | — | — | — | — |
| Sulfur |  | 2 | 1.8 | 2 | 1.8 | 2 | 1.8 | 1.8 | 1.8 | 1.6 | 1.4 |
| Organic thiosulfate compound *11 |  | — | 2 | — | 2 | — | 2 | 2 | 2 | 2 | 4 |
| Laboratory test | Time for resistance to thermal fatigue | Index | 100 | 103 | 106 | 110 | 108 | 104 | 125 | 126 | 132 | 135 |
| Actual running test | Resistance to thermal fatigue |  | — | −3 | −3 | −3 | — | −2 | −3 | 0 | — | 0 | — |

*1: SBR0120, made by JSR Corporation (bound styrene content: 35% by mass, content of vinyl bond: 16%, oil-extended with 35 parts by mass of aromatic oil based on 100 parts by mass of rubber component)
*2: Tufden 4350, made by Asahi Chemical Industry Co., Ltd. (bound styrene content: 39% by mass, content of vinyl bond: 38%, oil-extended with 50 parts by mass of aromatic oil based on 100 parts by mass of rubber component)
*3: SAF ($N_2SA$: 150 m$^2$/g)
*4: C9 aromatic resin (made by Nippon Sekiyu Kagaku Co., Ltd.)
*5: N-t-butyl-2-benzothiazyl sulfenamide (made by Ohuchi Shinko Kagaku Kogyo Co., Ltd.)
*6: tetrakis-2-ethylhexyl thiuram disulfide (made by Ohuchi Shinko Kagaku Kogyo Co., Ltd.)
*7: tetrakis-benzyl thiuram disulfide (made by Flexsys Co., Ltd.)
*8: zinc dibenzyl dithiocarbamate (made by Ohuchi Shinko Kagaku Kogyo Co., Ltd.)
*9: 1,6-bis(N,N'-dibenzylthiocarbamoyldithio)hexane (made by Bayer AG)
*10: 1,6-bis(N,N'-di(2-ethylhexyl)thiocarbamoyldithio)hexane
*11: sodium 1,6-hexamethylene dithiosulfate dihydrate (made by Flexsys Co., Ltd.)

TABLE 1(b)

|  |  | Example 5 | Example 6 | Example 7 | Example 8 | Example 9 | Example 10 | Example 11 | Example 12 | Example 13 | Example 14 |
|---|---|---|---|---|---|---|---|---|---|---|---|
| Styrene-butadiene copolymer rubber A *1 | part by mass | — | — | — | — | — | — | — | — | — | — |
| Styrene-butadiene copolymer rubber B *2 |  | 150 | 150 | 150 | 150 | 150 | 150 | 150 | 150 | 150 | 150 |
| Carbon black *3 |  | 70 | 70 | 70 | 70 | 70 | 70 | 70 | 70 | 100 | 120 |
| Aromatic oil |  | — | — | — | — | — | — | — | — | 30 | 50 |
| Resin A *4 |  | 20 | 20 | 20 | 20 | 20 | 20 | 20 | 20 | 20 | 20 |
| Vulcanization accelerator (CZ) *5 |  | 2 | 2 | 2 | 2 | 2 | 2 | 4 | 4 | 2 | 2 |
| Vulcanization accelerator (TOT) *6 |  | 4 | 2 | — | — | — | — | — | 2 | 4 | 4 |
| Vulcanization accelerator (TBzTD) *7 |  | — | — | 2 | — | — | — | — | — | — | — |
| Vulcanization accelerator (ZTC) *8 |  | — | — | — | 2 | — | — | — | — | — | — |
| Vulcanization accelerator (KA9188) *9 |  | — | — | — | — | 2 | — | — | — | — | — |
| Vulcanization accelerator *10 |  | — | — | — | — | — | 2 | 4 | 2 | — | — |
| Sulfur |  | 1.2 | 1.2 | 1.8 | 1.8 | 1.8 | 1.8 | 1.4 | 1.4 | 1.6 | 1.8 |
| Organic thiosulfate compound *11 |  | 4 | 6 | 2 | 2 | 2 | 2 | 2 | 2 | 2 | 2 |
| Laboratory test | Time for resistance to thermal fatigue | Index | 140 | 142 | 122 | 120 | 121 | 140 | 145 | 144 | 128 | 119 |

TABLE 1(b)-continued

|  |  | Example 5 | Example 6 | Example 7 | Example 8 | Example 9 | Example 10 | Example 11 | Example 12 | Example 13 | Example 14 |
|---|---|---|---|---|---|---|---|---|---|---|---|
| Actual running test | Resistance to thermal fatigue | — | 0 | 0 | — | −1 | −1 | 0 | 0 | 0 | — | −1 |

*1: SBR0120, made by JSR Corporation (bound styrene content: 35% by mass, content of vinyl bond: 16%, oil-extended with 35 parts by mass of aromatic oil based on 100 parts by mass of rubber component)
*2: Tufden 4350, made by Asahi Chemical Industry Co., Ltd. (bound styrene content: 39% by mass, content of vinyl bond: 38%, oil-extended with 50 parts by mass of aromatic oil based on 100 parts by mass of rubber component)
*3: SAF ($N_2SA$: 150 $m^2/g$)
*4: C9 aromatic resin (made by Nippon Sekiyu Kagaku Co., Ltd.)
*5: N-t-butyl-2-benzothiazyl sulfenamide (made by Ohuchi Shinko Kagaku Kogyo Co., Ltd.)
*6: tetrakis-2-ethylhexyl thiuram disulfide (made by Ohuchi Shinko Kagaku Kogyo Co., Ltd.)
*7: tetrakis-benzyl thiuram disulfide (made by Flexsys Co., Ltd.)
*8: zinc dibenzyl dithiocarbamate (made by Ohuchi Shinko Kagaku Kogyo Co., Ltd.)
*9: 1,6-bis(N,N'-dibenzylthiocarbamoyldithio)hexane (made by Bayer AG)
*10: 1,6-bis(N,N'-di(2-ethylhexyl)thiocarbamoyldithio)hexane
*11: sodium 1,6-hexamethylene dithiosulfate dihydrate (made by Flexsys Co., Ltd.)

TABLE 2

|  |  |  | Comparative Example 7 | Comparative Example 8 | Comparative Example 9 | Comparative Example 10 | Comparative Example 11 | Example 15 | Example 16 | Example 17 |
|---|---|---|---|---|---|---|---|---|---|---|
| Styrene-butadiene copolymer rubber A *1 | part by mass |  | 135 | 135 | 135 | 135 | — | — | — | — |
| Styrene-butadiene copolymer rubber B *2 |  |  | — | — | — | — | 150 | 150 | 150 | 150 |
| Carbon black *3 |  |  | 70 | 70 | 70 | 70 | 70 | 70 | 70 | 70 |
| Aromatic oil |  |  | 15 | 15 | 15 | 15 | 15 | — | — | — |
| Resin A *4 |  |  | 15 | 15 | 15 | 15 | 15 | 15 | 15 | 15 |
| Vulcanization accelerator (CZ) *5 |  |  | 2 | 2 | 1.5 | 1.5 | 1.5 | 1.5 | 1.5 | 1.5 |
| Vulcanization accelerator (zinc dithiophosphate) *6 |  |  | — | — | 0.5 | 0.5 | 0.5 | 0.5 | 0.5 | 0.5 |
| Sulfur |  |  | 2 | 1.8 | 2 | 1.8 | 2 | 1.8 | 1.4 | 1.2 |
| Organic thiosulfate compound *7 |  |  | — | 2 | — | 2 | — | 2 | 4 | 6 |
| Laboratory test | Time for resistance to thermal fatigue | Index | 100 | 103 | 105 | 109 | 107 | 118 | 123 | 126 |
| Actual running test | Resistance to thermal fatigue | — | −3 | −3 | −3 | −2 | −3 | −1 | −1 | 0 |

*1: SBR0120, made by JSR Corporation (bound styrene content: 35% by mass, content of vinyl bond: 16%, oil-extended with 35 parts by mass of aromatic oil based on 100 parts by mass of rubber component)
*2: Tufden 4350, made by Asahi Chemical Industry Co., Ltd. (bound styrene content: 39% by mass, content of vinyl bond: 38%, oil-extended with 50 parts by mass of aromatic oil based on 100 parts by mass of rubber component)
*3: SAF ($N_2SA$: 150 $m^2/g$)
*4: C9 aromatic resin (made by Nippon Sekiyu Kagaku Co., Ltd.)
*5: N-t-butyl-2-benzothiazyl sulfenamide (made by Ohuchi Shinko Kagaku Kogyo Co., Ltd.)
*6: zinc O,O'-dibutyldithiophosphate (made by Ohuchi Shinko Kagaku Kogyo Co., Ltd.)
*7 sodium 1,6-hexamethylene dithiosulfate dihydrate (made by Flexsys Co., Ltd.)

As seen from Table 1, the rubber compositions of Examples 1–14 comprising SBR with a content of vinyl bond of not less than 30% as a rubber component and a vulcanization accelerator represented by any one of the formulae (I) to (III) and an organic thiosulfate compound of the formula (V) are long in the tire for resistance to thermal fatigue, and also the tires using these rubber compositions in the tread are higher in the resistance to thermal fatigue. On the other hand, the rubber compositions of Comparative Examples 2–6 not satisfying the conditions defined in the invention are insufficient in the improvement of the time for resistance to thermal fatigue as compared with that of Comparative Example 1, and also the tires using such rubber compositions in the tread are large in the occurrence of crack and insufficient in the resistance to thermal fatigue.

As seen from Table 2, the rubber compositions of Examples 15–17 comprising SBR with a content of vinyl bond of not less than 30% as a rubber component and a compound of the formula (IV) and an organic thiosulfate compound of the formula (V) are long in the tire for resistance to thermal fatigue, and also the tires using these rubber compositions in the tread are higher in the resistance to thermal fatigue. On the other hand, the rubber compositions of Comparative Examples 8–11 not satisfying the conditions defined in the invention are insufficient in the improvement of the time for resistance to thermal fatigue as compared with that of Comparative Example 7, and also the tires using such rubber compositions in the tread are large in the occurrence of crack and insufficient in the resistance to thermal fatigue.

According to the invention, there can be provided rubber compositions capable of using in a tire tread to improve tire durability such as resistance to thermal fatigue and the like while maintaining high gripping property. Also, there can be provided high-performance tires using such a rubber composition in a tire tread.

What is claimed is:

1. A high performance pneumatic tire comprising a tread made from a rubber composition comprising (1) a rubber component comprising a styrene-butadiene copolymer rubber having a content of vinyl bond of not less than 30% and a bound styrene content of more than 30 mass % but not more than 60 mass %; (2) at least one compound selected from the group consisting of a compound represented by the following formula (I), a compound represented by the following formula (II), a compound represented by the following formula (III) and a compound represented by the following formula (IV); and (3) an organic thiosulfate compound represented by the following formula (V):

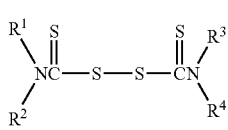
(I)

wherein $R^1$, $R^2$, $R^3$ and $R^4$ are independently a straight or branched alkyl group having a carbon number of 3–12 or an aralkyl group having a carbon number of 7–12;

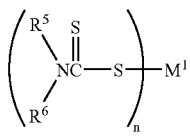
(II)

wherein $R^5$ and $R^6$ are independently a straight or branched alkyl group having a carbon number of 7–12 or an aralkyl group having a carbon number of 7–12, and $M^1$ is a bivalent or polyvalent metal and n is a number equal to an atomic valence of $M^1$;

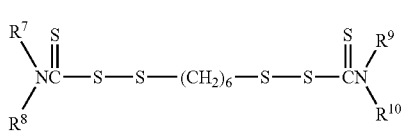
(III)

wherein $R^7$, $R^8$, $R^9$ and $R^{10}$ are independently a straight or branched alkyl group having a carbon number of 3–12 or an aralkyl group having a carbon number of 7–12;

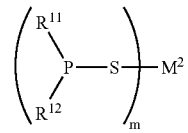
(IV)

wherein $R^{11}$ and $R^{12}$ are independently a straight or branched alkyl group having a carbon number of 1–18 or a cycloalkyl group having a carbon number of 5–12, and $M^2$ is zinc, copper or iron and m is a number equal to an atomic valence of $M^2$;

$$M^3O_3S-S-(CH_2)_o-S-SO_3M^3 \quad (V)$$

wherein o is a number of 3–10 and $M^3$ is one equivalent weight of lithium, potassium, sodium, magnesium, calcium, barium, zinc, nickel or cobalt, provided that the compound may contain crystal water.

2. A high performance pneumatic tire according to claim 1, wherein $R^1$, $R^2$, $R^3$ and $R^4$ in the formula (I) are independently a straight or branched alkyl group having a carbon number of 8–12.

3. A high performance pneumatic tire according to claim 2, wherein each of $R^{11}$, $R^2$, $R^3$ and $R^4$ is 2-ethylhexyl group.

4. A high performance pneumatic tire according to claim 1, wherein $R^{11}$ and $R^{12}$ in the formula (IV) are independently a straight or branched alkyl group having a carbon number of 2–8.

5. A high performance pneumatic tire according to claim 4, wherein each of $R^{11}$ and $R^{12}$ is isopropyl group or n-butyl group.

6. A high performance pneumatic tire according to claim 1, wherein a content of the styrene-butadiene copolymer rubber in the rubber component is 50–100 mass %.

7. A high performance pneumatic tire according to claim 1, wherein the organic thiosulfate compound represented by the formula (V) is sodium 1,6-hexamethylene dithiosulfate dihydrate.

8. A high performance pneumatic tire according to claim 1, wherein an amount in total of the compound of the formula (I), the compound of the formula (II) and the compound of the formula (III) is 0.5–10 parts by mass based on 100 parts by mass of the rubber component.

9. A high performance pneumatic tire according to claim 8, wherein an amount of the compound of the formula (I) is 0.5–10 parts by mass based on 100 parts by mass of the rubber component.

10. A high performance pneumatic tire according to claim 1, wherein an amount of the compound of the formula (IV) is 0.1–5 parts by mass based on 100 parts by mass of the rubber component.

11. A high performance pneumatic tire according to claim 1, wherein an amount of the compound of the formula (V) is 1–10 parts by mass based on 100 parts by mass of the rubber component.

* * * * *